A. WOOD & J. F. LIGHT.
Devices for Transmitting Motion.
No. 151,948. Patented June 9, 1874.
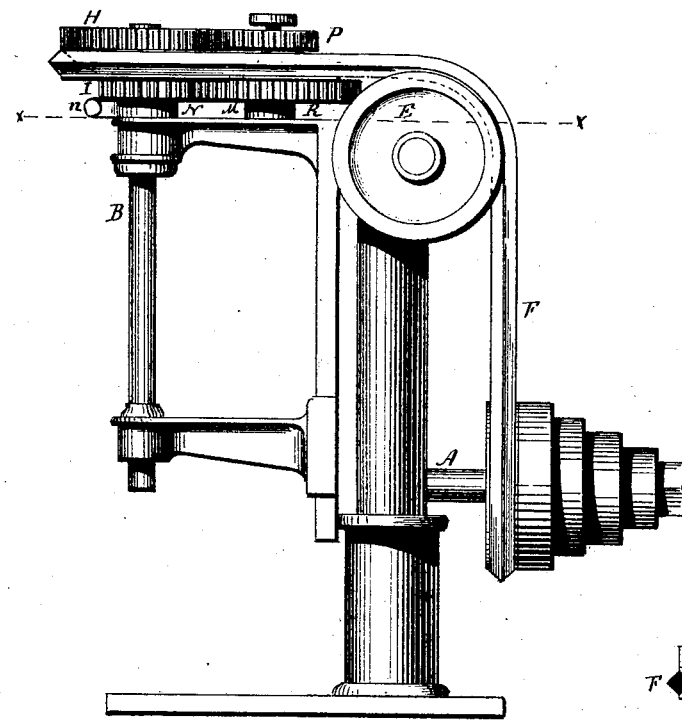
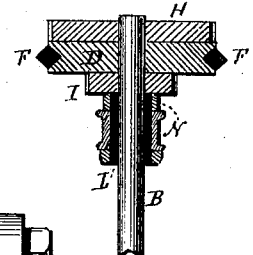
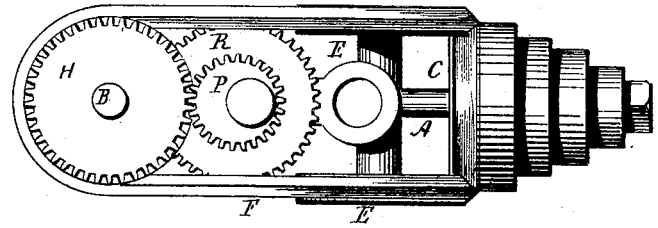
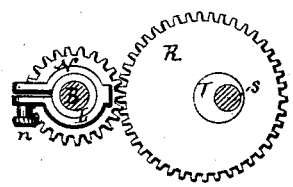

UNITED STATES PATENT OFFICE.

AURIN WOOD AND JOSEPH F. LIGHT, OF WORCESTER, MASSACHUSETTS, ASSIGNORS TO WOOD & LIGHT MACHINE COMPANY, OF SAME PLACE.

IMPROVEMENT IN DEVICES FOR TRANSMITTING MOTION.

Specification forming part of Letters Patent No. 151,948, dated June 9, 1874; application filed May 11, 1874.

*To all whom it may concern:*

Be it known that we, AURIN WOOD and JOSEPH F. LIGHT, of Worcester, in the county of Worcester and State of Massachusetts, have invented a new Improvement in Device for Transmitting Motion; and we do hereby declare the following, when taken in connection with the accompanying drawings and the letters of reference marked thereon, to be a full, clear, and exact description of the same, and which said drawings constitute part of this specification, and represent in—

Figure 1 a side view; Fig. 2, a top or plan view; Fig. 3, a vertical central section through the spindle, and in Fig. 4 a section on line $x\,x$ looking up.

This invention relates to an improvement in devices for transmitting motion from one shaft to another, which run in different angles to each other; and also in a device for multiplying power. In transmitting power from one pulley to the other, the axis of one being at an angle to the other, it has been the usual practice to twist the band, so that the same surface which runs upon one pulley will run upon the other pulley, and upon intermediate pulleys, to turn it from the line of one to the line of the other. This twisting of the band creates considerable friction and great wear upon the band. The object of this invention is principally to overcome this difficulty; and it consists, first, in the employment of a band, quadrangular in transverse section, running from one pulley to another, the axis of one pulley being at an angle to the other, the band passing over intermediate pulleys, and the pulleys grooved corresponding to the angles of the belt, so that one angle of the belt will run in the driving and the driven pulleys, and the transverse angle in the groove of the intermediate pulleys. Second, in a pair of differential gears upon the driven shaft or spindle, one of which is loose upon a collar splined to the shaft, and provided with means of clamping to said collar, the other fixed to the shaft, combined with a pair of differential gears fixed together to work into the first-named gears, with or without intermediate gears, the said second pair of gears hung upon an eccentric bearing, by means of which they may be thrown into or out of gear with the first two gears, as more fully hereinafter described.

In illlustrating this invention, I show it as applied to what is known as an upright or ratchet drill, but it is applicable alike to other purposes where a similar result is desirable.

A is the driving-shaft, and B the driven shaft or spindle, the one at right angles to the other. On the driven shaft is a pulley, C, having a V-groove, the angle of which is substantially, or by preference, a right angle. Onto the driven shaft a similar pulley, D, is arranged, and in line with the plane of both pulleys is an intermediate pulley, E, for each line of belt. The belt E is made substantially quadrangular, or of equal sides and equal angles, as seen in Fig. 3, and extends around the two pulleys C and D, one angle of the belt running in the groove of one pulley, a transverse angle over the intermediate pulley E, and the same angle around the driven pulley. Hence, the usual twisting, in order to have the same surface bear upon all the pulleys, is avoided. This constitutes the first part of my invention. To the spindle B a gear, H, is firmly attached, and around the shaft is a collar, L, which is splined to the shaft, so as to revolve with it. Above this collar is a loose pinion, I, and the driven pulley D, which are fixed together, and in connection with these is a clamping device, N, as seen in Fig. 4. This is closed upon the collar by means of a screw, $n$, so as to engage the collar and the pinion I and driven pulley, when occasion requires. When engaged the spindle will be driven with the driven pulley. On an axis parallel to the spindle B are two gears, P R, corresponding to the gears H I, and so as to work together when occasion requires, the gears P R both fixed to the same axis. The gear H is of larger diameter than the gear P, and the gear R of larger diameter than the gear I. When desired to multiply power upon the spindle B the gear I and pulley are loosened, so as to turn independent of the spindle. This, in turning, communicates its revolution to the gear I, and that through the gear P to the gear H, and the spindle attached thereto, reducing the relative velocity of the spindle in proportion to the diameters of the several gears.

In order to throw the gears P R out or into gear with the gears H I, the said gears P R are arranged upon a vertical shaft, T, and that shaft arranged upon an eccentric bearing, S, so that by turning the said shaft the gears P R will be thrown into or from the gears H I, as indicated in Fig. 4, according to the direction in which the shaft is turned. The shaft is thus turned by means of a collar, M, beneath the gear R, as seen in Fig. 1. When the gears are in connection the clamp N should be loose, but when the gears P R are thrown back then the gear I should be clamped.

Intermediate gears may be used when occasion requires.

I do not wish to be understood as broadly claiming an arrangement of differential gears for diminishing the velocity or increasing the power of the driven shaft, as such I am aware is not new.

I claim as my invention—

1. In combination with a driving and a driven pulley, the axes of rotation of which are at angles to each other, and intermediate or carrying pulleys in the plane of said driving and driven pulleys, all of said pulleys having an angular groove in their surface, a band which is quadrangular in form in transverse section, one angle of said band running in the driving and driven pulleys, and the transverse angle on the intermediate pulleys, substantially as and for the purpose described.

2. In combination with the two independent gears H I, the clamp N, the sleeve L, and the spindle B, the differential gears P R, both arranged upon a shaft, T, the said shaft hung upon an eccentric bearing, S, all substantially as and for the purpose specified.

AURIN WOOD.
JOSEPH F. LIGHT.

Witnesses:
JOSEPH A. HOWLAND,
OTIS WARREN.